(12) United States Patent
Pfanstiehl

(10) Patent No.: US 8,874,408 B2
(45) Date of Patent: Oct. 28, 2014

(54) LOW COST METHOD FOR CREATING PRODUCT CONDITION REPORTS FROM FIELD INSPECTIONS

(76) Inventor: John Gardner Pfanstiehl, Indian Rocks Beach, FL (US)

(*) Notice: Subject to any disclaimer, the term of this patent is extended or adjusted under 35 U.S.C. 154(b) by 924 days.

(21) Appl. No.: 13/024,472

(22) Filed: Feb. 10, 2011

(65) Prior Publication Data

US 2012/0209564 A1 Aug. 16, 2012

(51) Int. Cl.
G01B 5/02 (2006.01)
G06Q 50/10 (2012.01)
G06Q 10/00 (2012.01)

(52) U.S. Cl.
CPC ............... *G06Q 50/10* (2013.01); *G06Q 10/20* (2013.01)
USPC ......................................................... 702/170

(58) Field of Classification Search
CPC ............ G01B 7/06; G01B 7/66; G01B 21/08; G01B 5/02; G01B 5/06
USPC ................................................ 702/127, 170
See application file for complete search history.

(56) References Cited

U.S. PATENT DOCUMENTS

| | | | |
|---|---|---|---|
| 5,343,146 A | 8/1994 | Koch et al. | |
| 5,467,014 A | 11/1995 | Nix | |
| RE35,703 E | 12/1997 | Koch et al. | |
| 6,055,860 A | 5/2000 | Pfanstiehl | |
| 6,529,014 B1 * | 3/2003 | Nix ............................... | 324/662 |
| 6,724,187 B2 | 4/2004 | Nix | |
| D553,026 S | 10/2007 | Rust | |
| 7,418,408 B1 | 8/2008 | Heppe | |
| RE41,342 E * | 5/2010 | Koch et al. ..................... | 702/170 |
| 8,620,343 B1 * | 12/2013 | Lau et al. ..................... | 455/456.1 |
| 2005/0075843 A1 * | 4/2005 | Michiwaki et al. ........... | 702/188 |
| 2005/0210264 A1 * | 9/2005 | Vesikivi et al. ................ | 713/185 |
| 2006/0148594 A1 * | 7/2006 | Saintoyant et al. ........... | 473/405 |
| 2009/0157349 A1 * | 6/2009 | Walker .......................... | 702/170 |
| 2011/0267459 A1 * | 11/2011 | Choi .............................. | 348/135 |

* cited by examiner

*Primary Examiner* — Mohamed Charioui

(57) ABSTRACT

A low cost method of measuring parameters of a product in the field, such as the coating thickness on an individual vehicle, sends the measurement data set to a common pocket-size device also carried by the inspector, labels the data set, and transmits the data set to a remote computer to produce a product condition report. Alternately, the data can be transmitted directly to a remote buyer. The method is a low cost, practical and efficient because the inspector in the field only requires two pocket-size wireless devices. Inspectors are freed from carrying relatively bulky or heavy computers in the field. Furthermore, the method employs devices already owned by a numerous inspectors and the method requires no proprietary or expensive equipment. The remote computer permits the efficient addition of further information to create detailed reports that are organized or compiled and transmitted to customers.

3 Claims, 6 Drawing Sheets

LOW COST METHOD FOR CREATING PRODUCT CONDITION REPORTS FROM FIELD INSPECTIONS

CROSS-REFERENCE TO RELATED APPLICATIONS

Not Applicable

FEDERALLY SPONSORED RESEARCH

Not Applicable

THE NAMES OF THE PARTIES TO A JOINT RESEARCH AGREEMENT

Not Applicable

SEQUENCE LISTING

Not Applicable

FIELD OF THE INVENTION

The present invention relates to creating product condition reports containing measurements of product parameters taken in the field.

BACKGROUND OF THE INVENTION

There is a need for efficiently measuring parameters of products in the field to produce product condition reports containing objective documentation of products after they have left the source of production and are in the field. Measuring product parameters is most efficiently accomplished using a pocket-size hand-held, battery-powered measurement instrument. The term "in the field" is used to describe locations other than the place of manufacture of the product.

The need for efficiently measuring parameters of products in the field arises from concerns about quality control, damage in distribution, use or storage and to effectively determine the condition of the product after usage.

Inspection of the coating thickness of used vehicles is illustrative of the need to inspect products after they have left the source of production and are in the field.

Measurement of the parameter of paint thickness on a large number of vehicles can aid paint shop quality control of a vehicle manufacturer because paint thickness measurements are taken only intermittently on the assembly line.

Measurement of paint thickness on a large number of older vehicles can also aid a paint manufacturer or vehicle manufacturer in determining how the paint holds up to UV and other environmental stresses.

Measurement of paint thickness on an individual vehicle can provide objective and repeatable information to prospective buyers on the condition of the paint. More specifically, paint thickness measurements can show that the vehicle's paint has been excessively buffed, that the vehicle has been repainted, that the vehicle has been in an accident, and that there is hidden body damage under the paint.

The selling of used vehicles is a multi-billion dollar industry. Determining the condition of used vehicles is a substantial element of that industry and is of value to over one million customers per month.

CarFax produces and sells vehicle history reports on individual vehicles. The reports are comprised of data gathered from insurance companies, state motor vehicle departments and other sources. AutoCheck is one of the competitors to CarFax, and is owned by Experian which on its web site states that its business "delivers information solutions to manufacturers, dealers, finance and insurance companies and consumers." Experian further states "Annual sales are in excess of $3.8 billion." For this discussion, these companies will be termed the Vehicle History Report Industry. Producing and selling vehicle history reports on the condition of individual vehicles is a very active and profitable field with intense competition between the major corporations involved.

A major limitation of vehicle condition reports comprised of data from insurance companies and motor vehicle departments is that such data is often incomplete. It does not list accidents or paint damage when an insurance company does not pay for the repair. As one example, private owners sometimes pay for repair of damage out of pocket to avoid increases in insurance rates. Additionally, large companies with fleets, rental car companies being one common example, often self-insure their vehicles. Damage to the millions of self-insured vehicles would not be listed in insurance company databases. Paint thickness measurements can identify prior damage on self-insured vehicles but the Vehicle History Report Industry does not include paint thickness measurements in its vehicle condition reports.

Due to the major limitation of CarFax and AutoCheck vehicle condition reports, professional buyers or consumers visually inspect millions of used vehicles. Millions of vehicles are driven or shipped by truck to auction sites where buyers can visually inspect them. The primary reason why buyers desire visual inspection is to determine the condition of the body and paint, and particularly to determine if the vehicle has been in an accident and repaired. The mechanical condition is of less concern because many of the cars at auctions are still under factory warranties. Although the condition of the interior can be adequately judged through photographs, the exterior paint and the potential body damage underneath the paint cannot be conclusively determined by means of photographs.

Professional buyers and consumers frequently use paint thickness gauges to determine the condition of the paint and body of individual vehicles. The major corporations that manufacture paint thickness gauges are Pro Motorcar Products, Elcometer, Delfesko and Automation (Nix). The majority of these corporations have now made paint thickness gauges specifically designed for vehicle paint inspection in the field. Chinese-made gauges have also entered the market.

U.S. Pat. No. 6,055,860 to Pfanstiehl (2000), the present applicant, disclosed a method for using a coating thickness gauge to inspect a vehicle and determine if there is hidden damage.

Pro Motorcar Products created a paint thickness gauge that stored measurements in a predetermined sequence and then transmitted the data via RS-232 to a computer with a program to create a vehicle condition report containing that data. This required carrying a computer in the field when measuring the paint thickness to create a report on multiple vehicles and was seldom employed in the field.

Pro Motorcar Products also created and sold an inexpensive paint thickness gauge model, the "Paint and Body Inspection Gauge" specifically for used car buyers.

Subsequently, Automation offered a coating thickness gauge that transmitted measurements wirelessly to a computer to produce a vehicle condition report. This required carrying a computer in the field when measuring the paint thickness to create a report on multiple vehicles and was seldom employed in the field.

Elcometer created a relatively inexpensive paint thickness gauge model for field measurements of vehicles, their "311" gauge.

A large number of U.S. and foreign patents on coating thickness gauges have been issued to Pfanstiehl and licensed to Pro Motorcar Products, issued to Elcometer, issued to Nix for Automation, and issued to Koch et al for Delfesko. Other than the above referenced U.S. Pat. No. 6,055,860, these coating thickness gauge patents do not disclose novel material on production of vehicle condition reports.

For this discussion, these companies will be termed the Measuring Instrument Industry. None of the companies in the Measuring Instrument Industry have created an efficient, economical system for measuring paint thickness, creating a data set for an individual vehicle, labeling the data set and transmitting the labeled data set to a remote computer. Producing and selling vehicle condition inspection gauges is a second very active industry with intense competition between the corporations involved.

Another business sector also serves the need for specific information on the condition and value of individual vehicles in the field. The companies in this sector provide products that enable a buyer to download and view information on a specific vehicle including CarFax reports, the vehicle value as listed by services such as NADA or Kelly Blue Book, or current selling prices at major auctions such as the Manheim Auctions. The following products help buyers with their need for vehicle condition information when they are inspecting the vehicle at an auction, at a car lot or other locations in the field.

The Laser Appraiser 2.0 is a hand held device with a laser bar code reader that can read the vehicle identification number, VIN, from a bar code on a vehicle and use that number to wirelessly order, receive and display a CarFax report on that specific vehicle, or order and display vehicle values or auction results for that make, model and year vehicle. The device can communicate with computers on the user's computer networks. Laser Appraiser additionally sells applications for smartphones to enable ordering and receiving the same information in the field.

The VIN Viper is another hand held device with phone and an integrated laser bar code reader that can read the VIN on a vehicle and use that number to wirelessly order, receive and display a CarFax report on that specific vehicle, or order and display vehicle values or auction results for that make, model and year vehicle.

Competitors also include AutoRev, Gigglepoop, VINHunter Pro, and AutoNiq, all of which are fee based services and which offer software programs that run on smartphones. VINHunter Pro uses the smartphone camera to capture and decode the vehicle's VIN.

For this discussion, these companies will be called the Vehicle Data Field Service Industry. Producing and selling services and devices to provide history, valuation and sales data to buyers in the field is a third very active industry with intense competition between the products and corporations involved.

Because the long felt need for objective information on the condition of the paint and body of individual used vehicles has not been met, millions of buyers travel to visually inspect vehicles. Each year, millions of vehicles are transported to auctions, stored until the auction, sold at the auction and then shipped to the buyer. The present invention discloses a novel method that reduces or eliminates the visual inspection step and thereby produces savings in transportation costs, storage costs, auction fees, vehicle depreciation due to days lost, and buyer travel expenses that amount to hundreds of millions of dollar per year.

In spite of active competition in the three major industries described above, a practical, efficient solution to gathering objective information on the condition of the paint and body of individual used vehicles in the field has eluded the many people and corporations in these large industries. The present invention discloses a novel method that satisfies this particular long felt need and furthermore satisfies the need for a practical, efficient and inexpensive solution to gathering objective information on the condition of other products.

SUMMARY OF THE INVENTION

The present invention is a low cost, practical and efficient method of gathering measurements of a parameter of a product in the field, such as the coating thickness on an individual vehicle, sending the measurement data set to a common pocket-size device also carried by the inspector, labeling the data set, and sending it to a remote buyer or to a remote computer to produce a product condition report. The advantages of the present invention include:

a) elimination of the need to carry a computer by the inspector or by the buyer when traveling or when inspecting products or vehicles in the field;

b) elimination of the need to buy expensive proprietary or custom inspection devices;

c) elimination of the need to buy expensive data logging equipment to record measurement data sets;

d) elimination of the need to purchase expensive vehicle history reports, such reports often do not show paint or body damage suffered by the vehicle;

e) elimination of the need to purchase expensive monthly services that provide vehicle history reports to buyers in the field;

f) ability to use presently owned or commonly owned devices such as smartphones, PDA's or tablets to store and send data sets from the field;

g) ability to instantly send a condition report to a remote computer or a remote buyer;

h) ability to add product identification or additional product condition information to the data set when in the field;

i) ability to use presently owned or commonly owned computers in a remote location to enter further information and produce a more complete product condition report employing a user interface that is easier to use than the user interface on a hand held device;

j) ability to use a remote computer to collate individual product condition reports for use by manufacturers for quality control;

k) ability to use a remote computer to collate individual product condition reports for use by manufacturers to assess wear and reliability; and l) the present invention's methods do not require the creation, fabrication or production of new articles of manufacture.

The present invention solves a long felt need in highly competitive and highly active industries.

These improvements would not be obvious in view of the prior art taken as a whole to one of ordinary skill in this art.

BRIEF DESCRIPTION OF THE DRAWINGS

For a fuller understanding of the nature and the objects of the invention, reference should be made to the following detailed description, taken with the accompanying drawings, in which.

DETAILED DESCRIPTION OF EXEMPLARY EMBODIMENTS OF THE INVENTION

Figure 1:
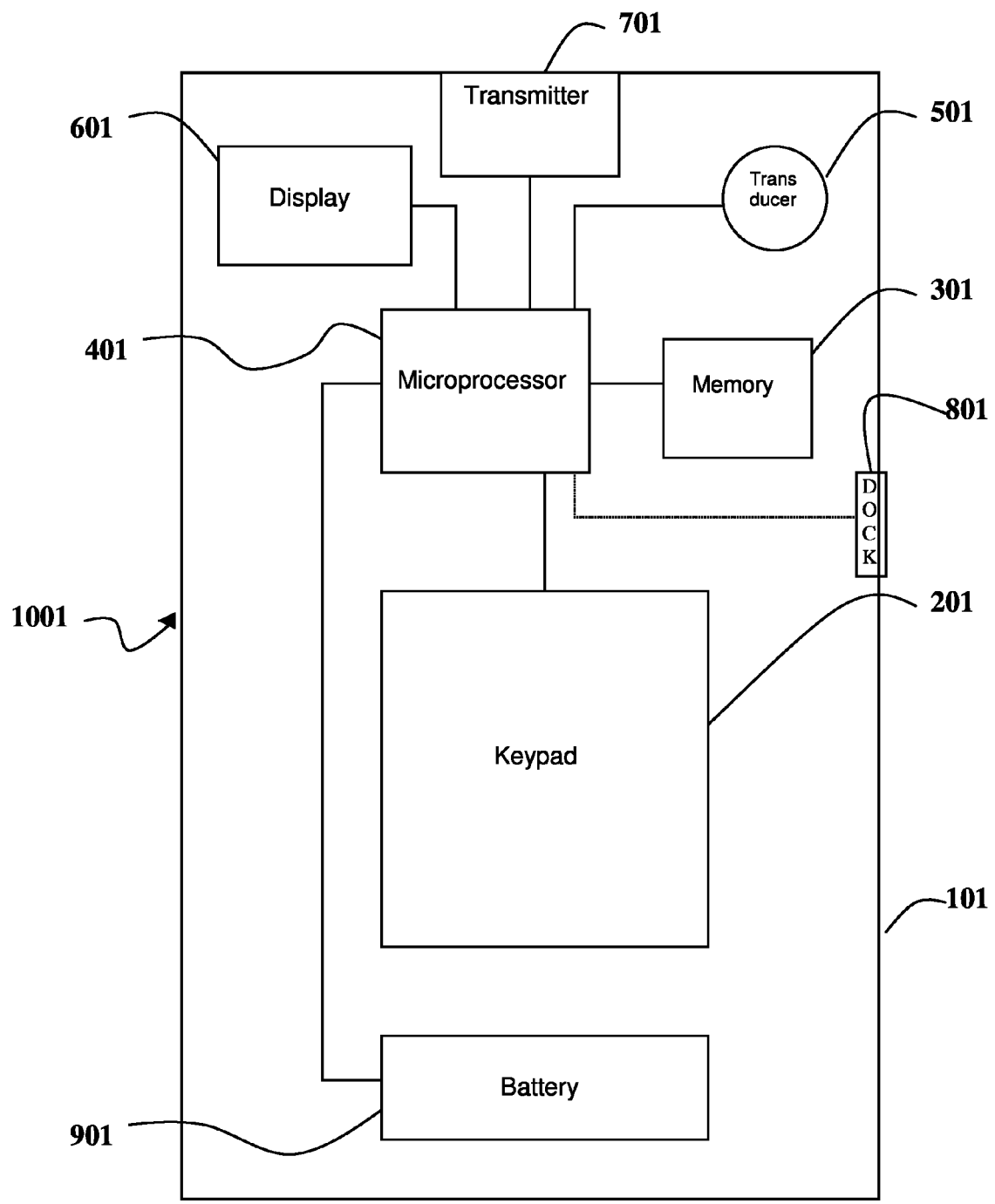
FIG. 1 is a schematic diagram illustrating the components of a measurement instrument.

The method of the present invention comprises a number of sequential steps. The first step is taking measurements of a predetermined parameter of a product in the field by an inspector using a hand-held, pocket-size, battery powered, electronic measuring instrument 1001. FIG. 1 illustrates in schematic form the necessary components of such an instrument. Enclosure 101 encloses keypad 201, memory 301, microprocessor 401, transducer 501, display 601, transmitter 701, docking connector 801, and battery 901.

Measurements are inputted to the instrument through transducer 501. The measurement value is displayed on display 601. Additionally, display 601 can show the operator the measurement number. Optionally display 601 can show the inspector the location on the product to take the measurement.

A measurement program in microprocessor 401 organizes the measurements and provides means for inspector input to retake measurements if a measurement error occurs, and provides means to start another set of measurements for a different product, or to take additional measurements in a specific area where damage is suspected Inspector input on keypad 201 controls the measurement program. Keypad 201 can also be a touch screen, roller ball or other conventional interface means.

The individual measurements are automatically recorded in memory 301 by the measurement program, producing a data set.

After the measurements are completed, upon command by the inspector a transmitter 701 wirelessly transmits the data set.

Figure 2:
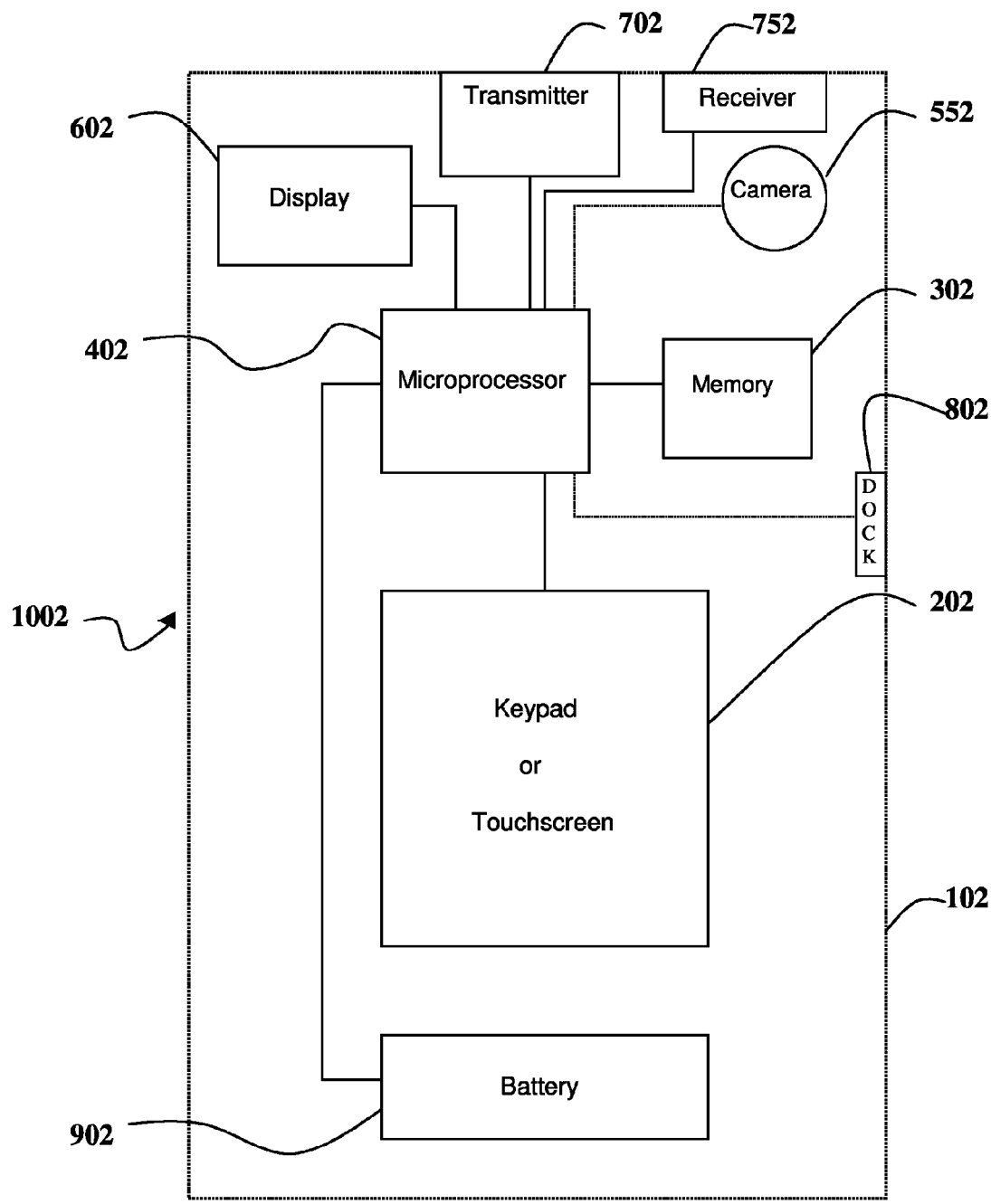
FIG. 2 is a schematic diagram illustrating the components of a hand held communication device.

A hand held, pocket-size, battery powered, electronic device 1002 receives the data set. FIG. 2 illustrates in schematic form the necessary components of such a device.

Wireless receiver 752 receives the data set or alternately, measuring instrument 1001 and device 1002 can be joined together by docking connector 802.

An application program in device 1002 takes the incoming data set, adds labeling information to identify the specific product to produce a labeled product data set, and sends the labeled product data set to a remote computer or directly to a customer via the Internet.

The labeling information can include a time stamp, a product identification number such as a serial number, a VIN, a written description or a photograph.

User input on keypad 202 controls the application program in conjunction with display 602. Keypad 202 can also be a touch screen, roller ball or other conventional interface means.

Labeling product information can also be input by keypad 202 or by optional camera 552.

The labeled product data set is transmitted by a transmitter 702 comprised of an electronic circuit that wirelessly transmits data to a network. The network is a cellular phone network including LTE, a Wi-Fi network, a WiMAX network or a satellite network that is connected to the Internet. The labeled product data set is received by a remote computer 1003 illustrated in FIG. 3 or directly to a remote interested party's computer or a remote interested party's smartphone.

The term "computer" includes main frame computers, desktop computers, laptops, tablet-pc's and netbooks including iPad's. The term "smartphone" includes feature phones and PDA's. The term "interested party" includes customers and business associates.

Figure 3:
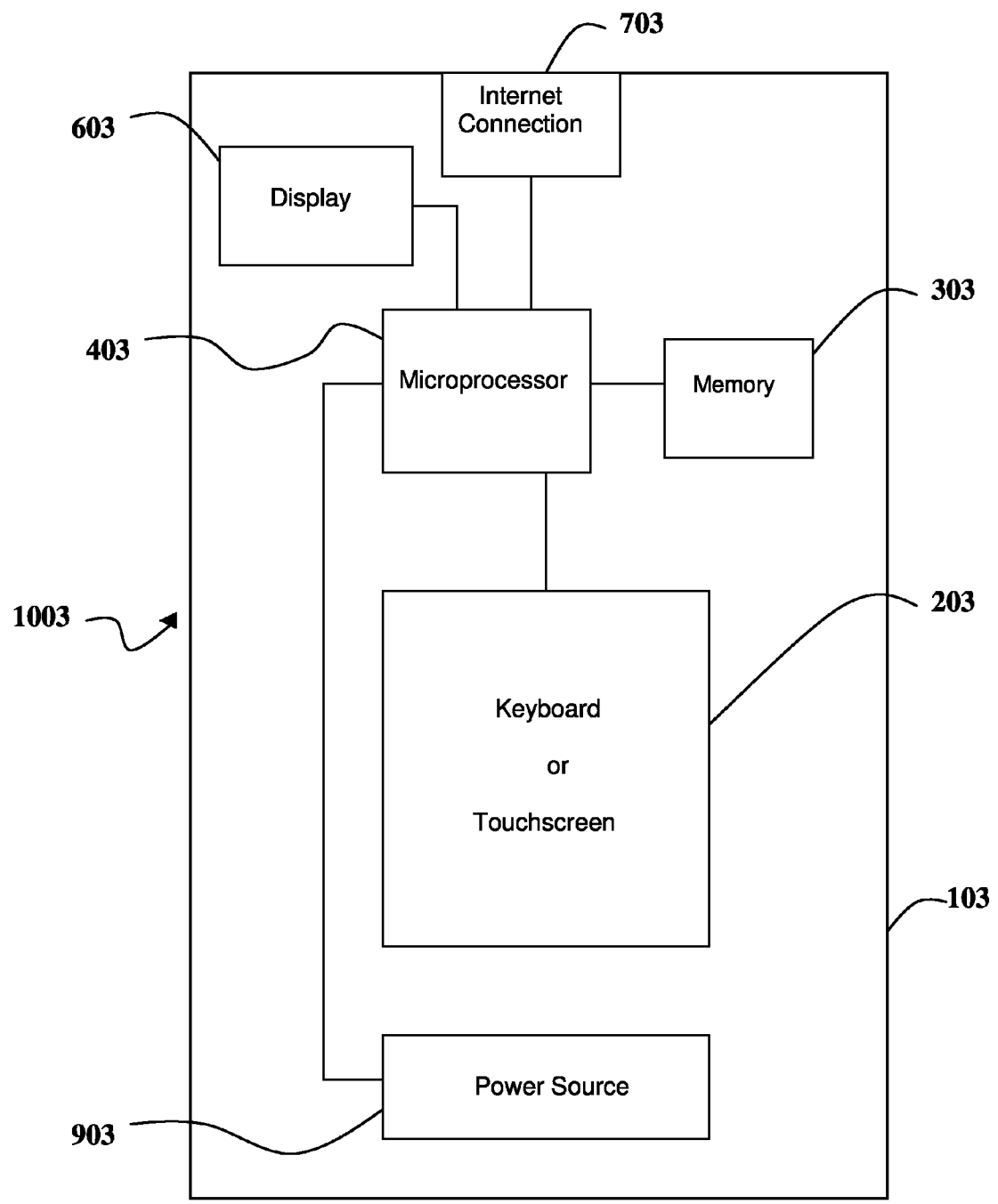
FIG. 3 is a schematic diagram illustrating the components of a remote computer.

FIG. 3 illustrates in schematic form the necessary components of such a remote computer.

Internet connection 703 receives the labeled product data set.

A product report software program is started on the remote computer to create a product condition report.

Additional information is input by keyboard 203.

The product condition report is transmitted to a printer or is transmitted by Internet connection 703 to a remote customer of an interested party such as an associate.

Figure 4:
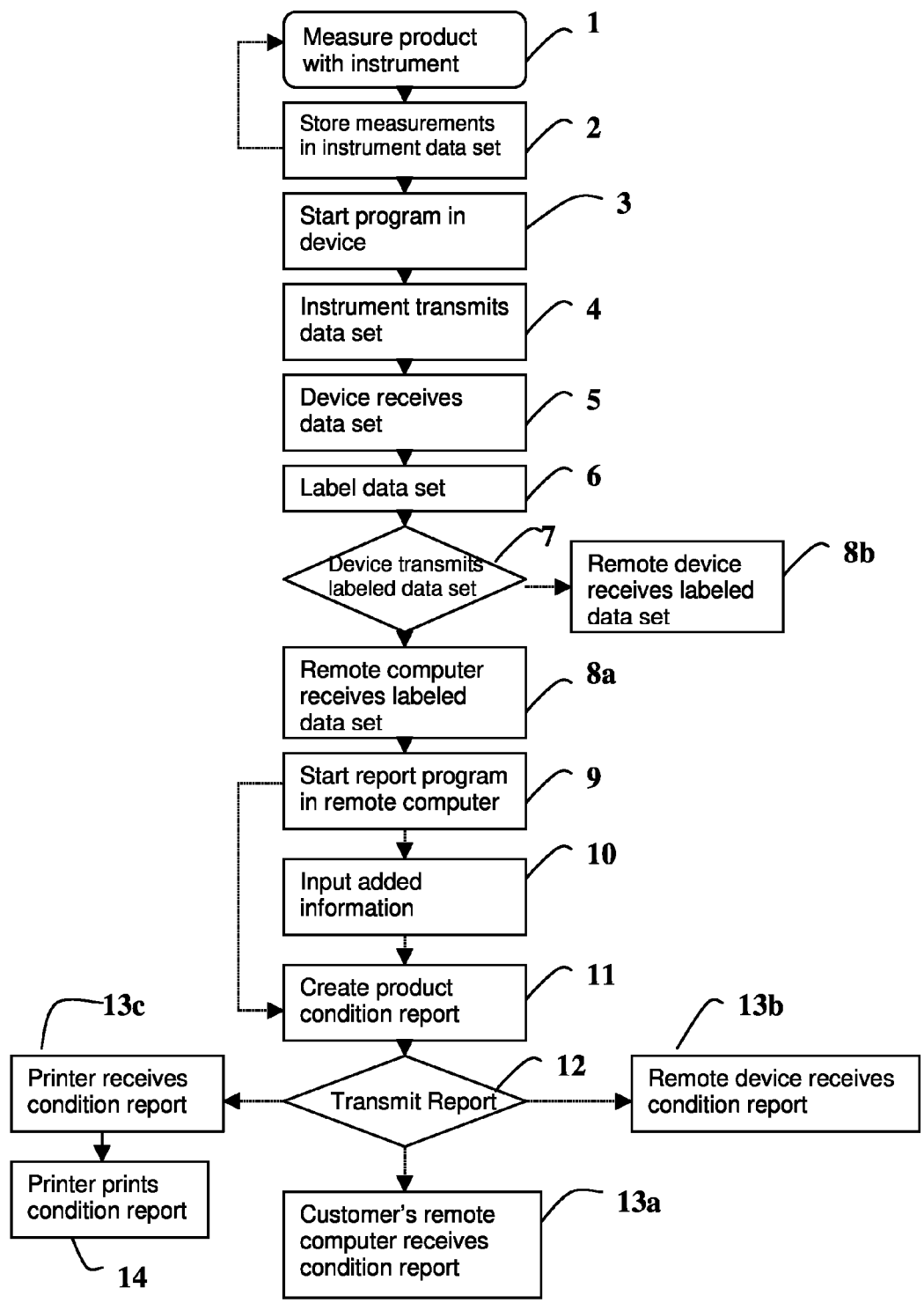
FIG. 4 is a schematic flow diagram showing the steps in a first embodiment of the present invention.

FIG. 4 illustrates a schematic flow diagram detailing the sequence of primary operations in the present invention. A small electronic measuring instrument or gauge measures (1) a parameter of a product in the field.

As each measurement is taken, the gauge stores (2) it in the gauge's memory in a data set. The measuring (1) and the storing (2) of measurements is repeated as often as the inspector desires.

When the measuring is completed on the product, the inspector starts (3) a product data set application program in a separate pocket-size device such as a smartphone.

The inspector then transmits (4) the data set from the gauge.

The device receives (5) the data set.

The data set is labeled (6) to identify the product that was measured. Examples of labeling are time stamps, photographs, GPS locations or information such as a product number input by the inspector.

The device transmits (7) the labeled data set.

A remote computer receives (8a) the labeled data set. Alternately or additionally, an interested party's remote smartphone receives (8b) the labeled data set.

Optionally, a product report software program is started (9) on the remote computer that receives the labeled data set.

The report software program permits inputting (10) added information. Inputting added information is substantially easier on a computer than a smartphone or PDA. Optionally, photographs, charts and further descriptive materials can be organized and modified by the software.

The software is used to create (11) a product condition report.

The remote computer transmits (12) the product condition report.

A customer's or associate's remote computer receives (13a) the product condition report. Alternately or additionally, an on-site printer receives (13c) the product condition report and prints (14) the report or a customer's or associate's remote smartphone receives (13b) the product condition report.

Figure 5:
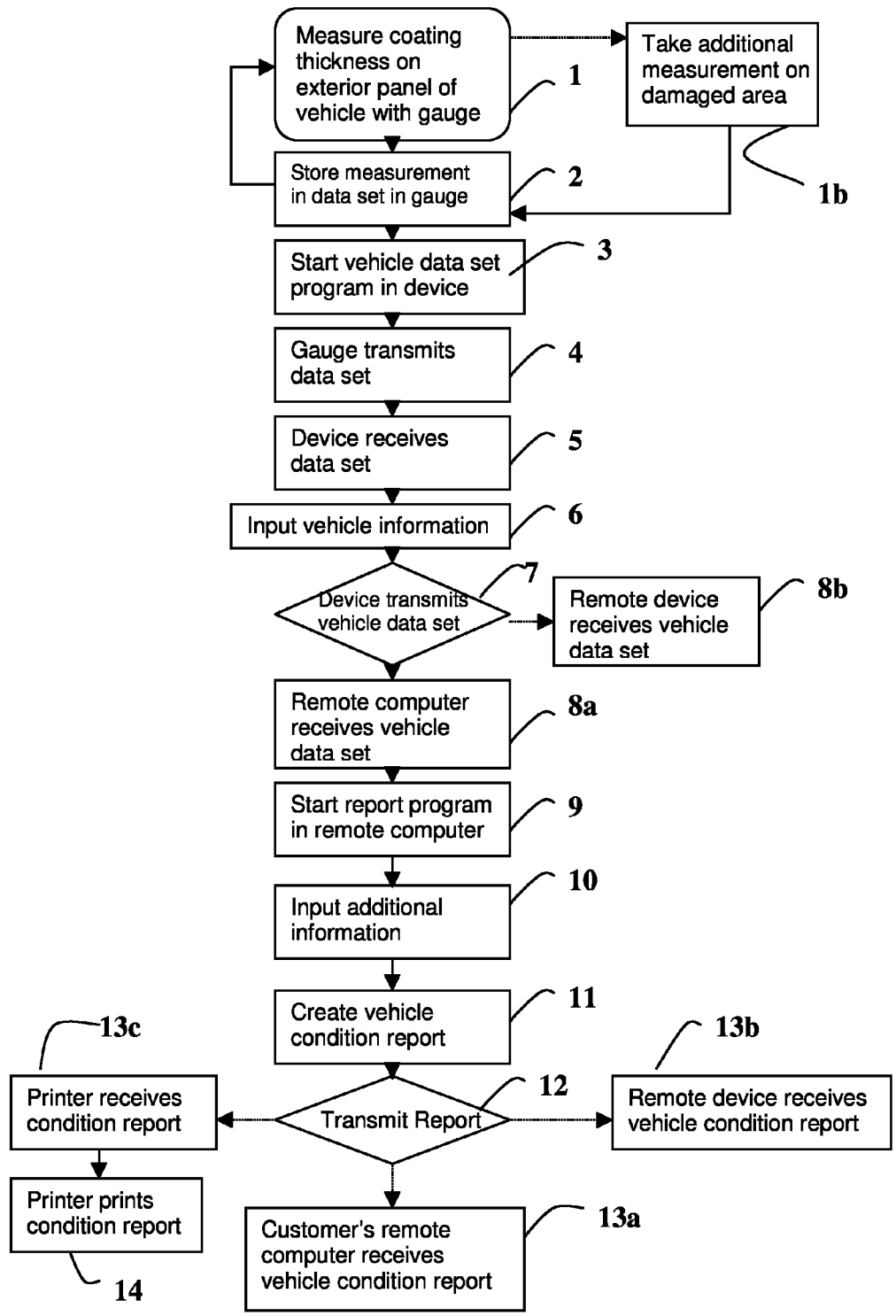
FIG. 5 a schematic flow diagram showing the steps in a second embodiment of the present invention.

FIG. 5 illustrates a schematic flow diagram detailing the sequence of primary operations in the present invention as applied to inspection of used vehicles in the field.

In the field, an inspector measures (1) coating thickness on an exterior body panel of a vehicle at a predetermined location using a small electronic measuring instrument or gauge.

As the measurement is taken, the gauge automatically stores (2) the measurement in the gauge's memory in a coating thickness data set. The inspector then measures the coating thickness in another predetermined location, typically in a predetermined sequence. The locations and order for the measurements can be shown on the display of the measuring instrument or on a label on the measuring instrument.

If a measurement indicates the potential of prior damage to the vehicle's paint or body, the inspector can take additional measurements (1b) in the area suspected of damage.

Optionally, the inspector can enter a subroutine on the gauge to store the additional measurements.

The gauge can take coating thickness measurements of coatings on both ferrous and non-ferrous substrates.

The gauge typically measures coating thickness in the range of 0 to 500 microns (0 to 20 mils) or 0 to 999 microns (0 to 40 mils).

Optionally, the inspector can enter a vehicle identification number, VIN, manually or by using an integral VIN reader. The VIN is then attached to the vehicle's data set.

When the measuring is completed on the vehicle, the inspector starts (3) a vehicle data set application program in a separate pocket-size device such as a smartphone.

The inspector then transmits (4) the coating thickness data set from the gauge.

The device receives the data set (5).

The inspector inputs (6) vehicle information into the device, such as the VIN, the condition of other components, photographs, the odometer reading or items needing repair. The vehicle information and the data set create a vehicle data set.

The device transmits (7) the vehicle data set.

A remote computer receives (8a) the vehicle data set. Alternately or additionally, a customer's remote smartphone receives (8b) the vehicle data set.

A vehicle report software program is started (9) on the remote computer that receives the vehicle data set. The vehicle report software program permits inputting (10) additional information. Inputting additional information is substantially easier on a computer than on a smartphone or PDA. The additional information can include CarFax or AutoCheck reports for that vehicle, current auction sale prices for that specific make, model and year of vehicle, reviews of that model, cropping of photographs, or other items to be organized, modified or formatted by the software.

The vehicle report software program creates (11) a finished and complete vehicle condition report.

The remote computer can be used to compile and collate many vehicle condition reports to produce compiled reports on a number of specific makes, models or years of vehicles to provide field data for quality control of vehicle manufacturers or paint manufacturers. Compiled reports can provide objective information on initial quality, or help asses the effects of transportation, storage, or environmental damage. The VIN labeling enables compiled reports to be produced for specific factory sites or for metrics on the performance of various shifts or assembly teams.

The remote computer transmits (12) the vehicle condition report.

A customer's remote computer or an associate's remote computer receives (13a) the vehicle condition report. Alternately or additionally, an on-site printer receives (13c) the vehicle condition report and prints a report (14) or a customer's or associate's remote smartphone (13b) receives the vehicle condition report.

Figure 6:
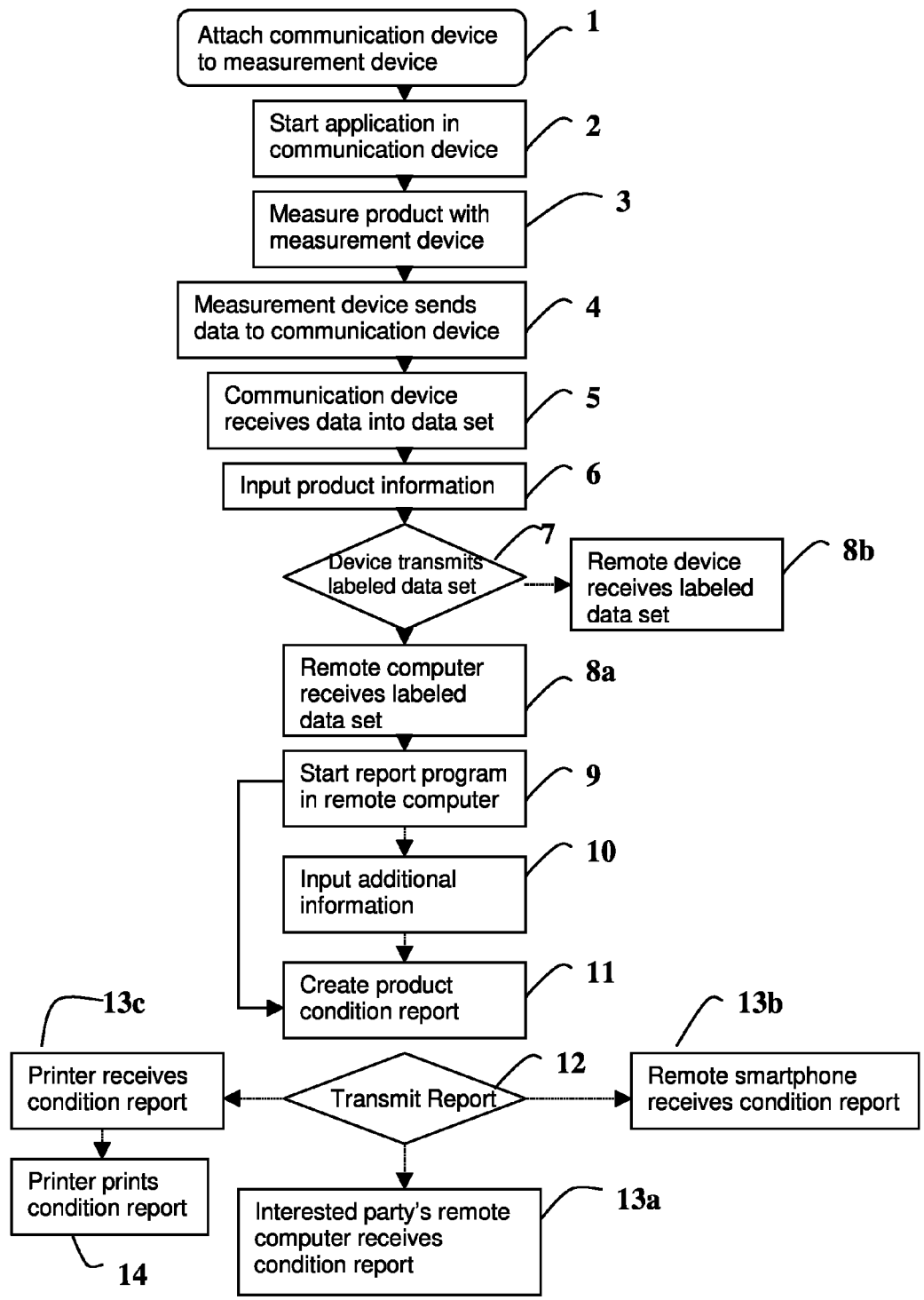
FIG. 6 is a schematic flow diagram showing the steps in a third embodiment of the present invention.

FIG. 6 illustrates a schematic flow diagram detailing the sequence of primary operations in the present invention as applied to inspection of products in the field using a measurement device with a docking port.

The inspector attaches (1) a pocket-size, battery-powered communication device having a display, a wireless receiver, an electronic circuit that wirelessly transmits data to a network, and an interface for user input to the docking port of a portable, pocket-size, hand-held, battery-powered measurement device.

The measuring device is a self-contained measurement instrument that physically and electrically attaches to the communication device by their respective docking ports.

In another embodiment, the measuring device is a transducer that physically and electrically attaches to the communication device by their respective docking ports. This permits elimination of the cost and space requirements of most of the parts in a self-contained measurement instrument, notably the battery, user interface and display. This produces lighter weight, smaller and less expensive measuring devices to be used with the communication device.

In another embodiment, the measuring device is a transducer attached to the communication device during manufacture to create a single combination device. This creates a combination device that further reduces weight, size and expensive.

The inspector starts (2) a product data set application program in the communication device.

The inspector takes (3) measurements of a parameter of a product using the measurement device.

The measurement device automatically transmits (4) the measurements to its docking port.

The communication device receives (5) the measurements at its docking port creating a data set.

The attachment of the measuring device to the communication device also creates a more efficient process for labeling specific measurements with their location. For example, when an inspector finds proof of hidden damage on a vehicle's body panel, the inspector can take a photograph of the location of the measurement. The photograph can be linked to the measurement or the measurement can be inserted into the photographic image.

Alternately, a touch screen on the communication device can be used to expand a diagram of the body panels on a vehicle enabling labeling of the locations of specific measurements.

After the measurements are completed, the inspector inputs (6) product information to the data set to label or identify which product is being measured creating a labeled product data set. Examples of labeling are time stamps, photographs, GPS locations or information such as a product number. The user input interfaces such as graphical interfaces, touch screens or keypads of conventional smartphones and PDA's enable easier and faster input of product information to the data set compared to the simple button interfaces of conventional measuring instruments such as coating thickness gauges.

The communication device transmits (7) the labeled data set.

A remote computer receives (8a) the labeled data set. Alternately or additionally, a customer's remote smartphone receives (8b) the labeled data set.

A product report software program is started (9) on the remote computer that receives the labeled data set.

The report software program permits inputting (10) additional information when necessary. Inputting additional information is substantially easier on a computer than a smartphone or PDA. Optionally, photographs, charts and further descriptive materials can be organized and modified by the report software program.

The report software program creates (11) a product condition report.

The remote computer transmits (12) the product condition report.

A second remote computer, typically a customer's computer or an associate's computer, receives (13*a*) the product condition report. Alternately or additionally, an on-site printer receives (13*c*) the product condition report and prints (14) the report, or a remote smartphone of a customer or an associate receives (13*b*) the product condition report.

This invention is clearly new and useful. Moreover, it was not obvious to those of ordinary skill in this art at the time it was made in any of the three highly competitive industries active in this art.

It will thus be seen that the objects set forth above, and those made apparent from the foregoing description, are efficiently attended. Since certain changes may be made in the foregoing construction without departing from the scope of the invention, it is intended that all matters contained in the foregoing construction or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall there between.

What is claimed is:

1. A method for efficiently measuring the exterior coating thickness of a vehicle in the field to produce a vehicle condition report containing objective documentation reporting the condition of the body and paint of said vehicle, comprising:
   a) taking a plurality of measurements of the coating thickness of exterior body panels of a vehicle at predetermined locations in a predetermined sequence using a pocket-size, battery-powered coating thickness gauge,
   b) automatically storing said plurality of measurements of the coating thickness of exterior body panels of said vehicle at predetermined locations in a predetermined sequence in an internal memory in said gauge in a complete coating thickness data set using an internal program in said coating thickness gauge,
   c) starting a vehicle data set application program in a pocket-size, battery-powered device having a wireless receiver, an electronic circuit that wirelessly transmits data to a network, a display and an interface for user input,
   d) transmitting said plurality of measurements of the coating thickness of exterior body panels of said vehicle at predetermined locations in a predetermined sequence in said complete coating thickness data set wirelessly from said coating thickness gauge to said device,
   e) receiving said plurality of measurements of the coating thickness of exterior body panels of said vehicle at predetermined locations in a predetermined sequence in said complete coating thickness data set from said coating thickness gauge into said device,
   f) transmitting said data set from said device and,
   g) receiving said data set into a remote computer or a remote smartphone.

2. The method of claim 1 further comprising the step of:
inputting vehicle information into said application running on said device.

3. The method of claim 1 further comprising the step of:
   a) starting a vehicle report software program on said remote computer,
   b) inputting additional information when necessary using said vehicle report software program,
   c) creating a vehicle condition report, and
   d) transmitting said vehicle condition report to a printer or to an interested party's remote computer or to an interested party's smartphone.

\* \* \* \* \*